(12) United States Patent
Gross

(10) Patent No.: US 12,704,770 B2
(45) Date of Patent: Aug. 11, 2026

(54) CAMERA HOLDER FOR FASTENING A CAMERA TO A STORAGE LIFT, AND STORAGE LIFT HAVING A CAMERA HOLDER OF THIS TYPE

(71) Applicant: Hänel GmbH & Co. KG, Bad Friedrichshall (DE)

(72) Inventor: Martin Gross, Oedheim (DE)

(73) Assignee: Hänel GmbH & Co. KG, Bad Friedrichshall (DE)

( * ) Notice: Subject to any disclaimer, the term of this patent is extended or adjusted under 35 U.S.C. 154(b) by 148 days.

(21) Appl. No.: 18/854,201

(22) PCT Filed: Apr. 4, 2023

(86) PCT No.: PCT/EP2023/058818
§ 371 (c)(1),
(2) Date: Oct. 4, 2024

(87) PCT Pub. No.: WO2023/194365
PCT Pub. Date: Oct. 12, 2023

(65) Prior Publication Data

US 2025/0244644 A1 Jul. 31, 2025

(30) Foreign Application Priority Data

Apr. 5, 2022 (DE) .................... 10 2022 108 125.7

(51) Int. Cl.
*G03B 17/56* (2021.01)
*F16M 13/02* (2006.01)

(52) U.S. Cl.
CPC .......... *G03B 17/561* (2013.01); *F16M 13/02* (2013.01)

(58) Field of Classification Search
CPC ........ G03B 15/02; G03B 15/05; G03B 15/06; G03B 15/07; G03B 17/561;
(Continued)

(56) References Cited

U.S. PATENT DOCUMENTS

2003/0067545 A1* 4/2003 Giron .................... G03B 15/06 348/223.1
2009/0252486 A1* 10/2009 Ross, Jr. ............... G03B 29/00 396/419

(Continued)

FOREIGN PATENT DOCUMENTS

CN 104132226 B 6/2016
DE 29905420 U1 7/1999

(Continued)

*Primary Examiner* — Lin Ye
*Assistant Examiner* — Chriss S Yoder, III
(74) *Attorney, Agent, or Firm* — Timothy W. Menasco, Esq.; Harter Secrest & Emery LLP

(57) ABSTRACT

The invention relates to a camera holder (18) for fastening a camera (16) to a storage lift (10), comprising a holding device (20) for fastening the camera (16), a fastening device (22) for fastening the camera holder (18) to the storage lift (10), at least one fastening element (24) which connects the fastening device (22) to the holding device (20), and at least one spring element (26) which is arranged between the holding device (20) and the fastening device (22) and which elastically couples the holding device (20) and the fastening device (22) to one another. Furthermore, the invention relates to a storage lift (10) for storing stored goods, which has a camera holder (18) and a camera (16).

13 Claims, 4 Drawing Sheets

Figure 1:
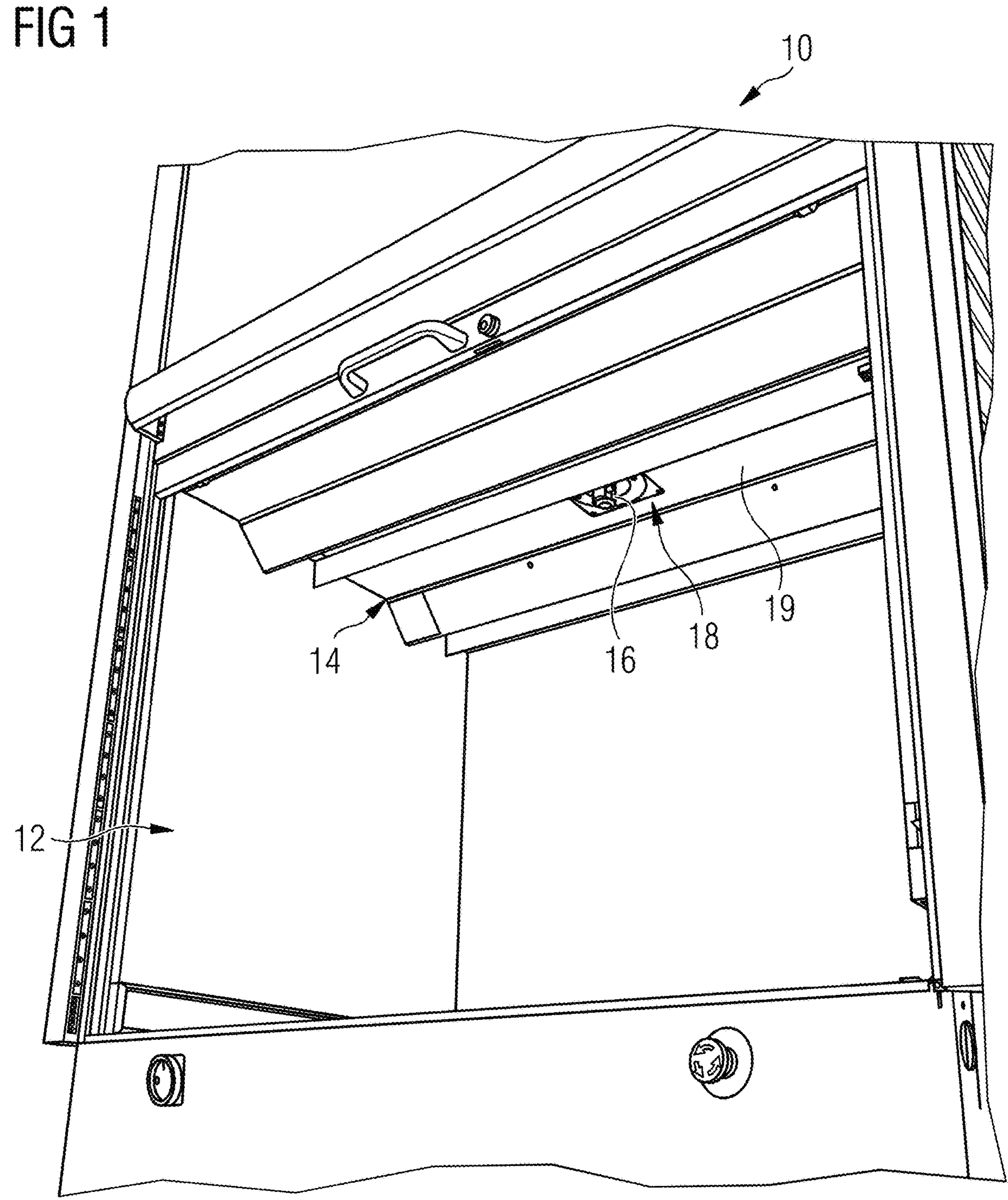

(58) Field of Classification Search
CPC ... G03B 2215/0521; G03B 2215/0567; G01M 11/08; G01M 11/081; F16M 13/02
See application file for complete search history.

(56) References Cited

U.S. PATENT DOCUMENTS

| | | | | |
|---|---|---|---|---|
| 2010/0128122 | A1 | 5/2010 | Wright et al. | |
| 2017/0261064 | A1 | 9/2017 | Liu et al. | |
| 2018/0094765 | A1 | 4/2018 | Riddiford et al. | |
| 2019/0127084 | A1* | 5/2019 | Yau ...................... | G03B 15/006 |

FOREIGN PATENT DOCUMENTS

| | | | |
|---|---|---|---|
| DE | 102010028956 | A1 | 11/2011 |
| DE | 102018115697 | A1 | 1/2020 |
| JP | 2013124705 | A | 6/2013 |
| KR | 20140004877 | U | 9/2014 |

* cited by examiner

CAMERA HOLDER FOR FASTENING A CAMERA TO A STORAGE LIFT, AND STORAGE LIFT HAVING A CAMERA HOLDER OF THIS TYPE

The present invention relates to a camera holder for fastening a camera to a storage lift. Furthermore, the invention relates to a storage lift for storing stored goods with such a camera holder.

A camera holder of the type mentioned at the beginning is used to arrange a camera, which is used to record stored goods arranged on a storage goods carrier, in the area of a retrieval location of a storage lift. In a known camera holder, the camera is mounted on a ball joint, whereby the ball joint is fixed to the upper side of the retrieval location via an angle connector. The camera is fixed in one position by a clamping screw located on the ball joint. When tightening the clamping screw, the camera may be slightly displaced. In addition, the connection can become loose due to vibrations when the storage lift is in operation. In addition, in order to adjust the ball joint and a lens of the camera, it is necessary to dismantle a cover that covers an opening for the camera to pass through at the upper side of the retrieval location.

The present invention is based on the object of creating a camera holder and a storage lift that enable cost-effective and vibration-proof mounting and simple adjustment of a camera.

To solve the problem, a camera holder with the features of claim 1 and a storage lift with the features of claim 13 are proposed.

Advantageous embodiments of the camera holder and the storage lift are the subject of the respective dependent claims.

According to a first aspect of the invention, a camera holder for fastening a camera to a storage lift is proposed. The camera holder according to the invention has a holding device for fastening the camera, a fastening device for fastening the camera holder to the storage lift, at least one fastening element which connects the fastening device to the holding device and at least one spring element which is arranged between the holding device and the fastening device and which elastically couples the holding device and the fastening device to one another.

Thanks to the combination of fastening element and spring element, the camera holder according to the invention enables cost-effective and vibration-proof mounting and simple adjustment of a camera on a storage lift. Furthermore, the camera can be tilted continuously in several axes.

In an advantageous embodiment, the camera holder is arranged in a retrieval location of a storage lift, in particular on the upper side of a retrieval location of a storage lift. The retrieval location is also known as the retrieval opening and is used to feed and remove storage goods carriers (containers). Advantageously, the images captured by the camera are stored in a storage goods management system of the storage lift.

The holding device and the fastening device can be made of metal or plastic, in particular fiber-reinforced plastic. In particular, the holding device and/or the fastening device are made of steel, in particular galvanized steel.

The holding device can have at least one means that interacts with the fastening element in order to connect the holding device to the fastening device. For example, the means can be a blind rivet nut or a threaded hole.

The fastening device can have an opening for the camera, in particular a lens of the camera, to pass through. The fastening device can be connected to the upper side of a retrieval location of a storage lift.

The fastening element can connect the fastening device and the holding device in a form-fit, force-fit and/or material-fit manner. The fastening element can be a screw element, in particular a cylinder screw with a hexagon socket.

The spring element can be a metal helical spring or an elastomer body.

Advantageously, the spring element surrounds at least one section of the fastening element. If the fastening element is formed as a cylinder screw and the spring element is formed as a helical spring, then the helical spring advantageously surrounds the cylinder screw.

In an advantageous embodiment, the fastening element and the spring element are arranged parallel to each other. This means that when the fastening element is tightened, the spring element simultaneously exerts a spring force. The combination of fastening element and spring element allows a camera to be adjusted and secured in position.

In an advantageous embodiment, three fastening elements are provided, which connect the fastening device to the holding device, and three spring elements are provided, which are arranged between the holding device and the fastening device. This creates a spring-loaded tripod for vibration-proof mounting and simple adjustment of a camera on a storage lift.

In an advantageous embodiment, the spring element is a compression spring. A compression spring is available as an inexpensive standard component. The compression spring can be a helical spring. In addition, the compression spring can be made of metal or plastic.

In an advantageous embodiment, the fastening element is a screw, whereby a section of a thread of the screw is advantageously provided with a microencapsulated adhesive. As a result of the micro-encapsulated adhesive, a sufficiently strong and vibration-proof connection is created between the holding device and the fastening device. Advantageously, the screw is a cylinder screw with a hexagon socket.

In an advantageous embodiment, the spring element surrounds the fastening element. This creates a parallel connection of the spring element and the fastening element.

In an advantageous embodiment, the fastening device has elongated holes for receiving fastening screws that are screwed to the upper side of the retrieval location. The elongated holes allow the camera holder to rotate along a lens axis. In an advantageous embodiment, the fastening element has four elongated holes, whereby a fastening screw can be inserted into each elongated hole.

In an advantageous embodiment, at least one washer is arranged between the fastening screw, in particular a pan-head sheet metal screw with cross recess, and the fastening element in order to screw the fastening device to the storage lift. Advantageously, the fastening screws are screwed to a cover plate of a retrieval location of a storage lift.

In an advantageous embodiment, the fastening device is formed as a plate with an opening for the camera to pass through. The plate forms a cover which can be fixed to the upper side of a retrieval location of the storage lift, in particular to a cover plate of a retrieval location of a storage lift. The plate can have a through opening for the fastening element to pass through. Advantageously, the plate has three through openings. Advantageously, the plate has elongated holes for receiving fastening screws, which are screwed to the upper side of the retrieval location. In particular, the plate can have four elongated holes.

In an advantageous embodiment, the holding device has at least one blind rivet nut with which the fastening element interacts. To fasten the holding device to the fastening device, the fastening element, which is formed as a screw element, in particular as the cylinder screw with a hexagon socket, is passed through the through opening and screwed into the blind rivet nut.

In an advantageous embodiment, the holding device is formed as a base plate that has a recess for the camera. The base plate can be made of metal or plastic, in particular fiber-reinforced plastic.

In an advantageous embodiment, a cover plate is provided with a recess for the camera, which is connected to the base plate via the fastening element, whereby the recesses form a through-opening for the camera to pass through in the connected state. The cover plate can be made of metal or plastic, in particular fiber-reinforced plastic. To connect the cover plate to the base plate, the cover plate can have a through hole for the fastening element to pass through. Advantageously, the cover plate has two through holes.

In an advantageous embodiment, the holding device has an angled flange element for fastening the camera. Advantageously, the camera is screwed to the flange element. For this purpose, the flange element can have an opening through which a screw element, in particular a cylinder screw with a hexagon socket, can be inserted and screwed into the camera, in particular an internal thread of a camera housing. The flange element can project perpendicularly to the holding device, which is formed as a base plate.

In an advantageous embodiment, at least one O-ring is arranged between the flange element and the camera. The O-ring increases the friction between the camera and the holding device, in particular the angled flange element. The O-ring can be made of an elastomeric material.

According to a further aspect, a storage lift for storing stored goods is proposed. The storage lift has a camera holder according to the invention and a camera fixed to the camera holder.

In an advantageous embodiment, the camera holder is arranged on the upper side of a retrieval location of the storage lift. This allows the camera to capture stored goods that are located on a storage goods carrier.

Figure 2:
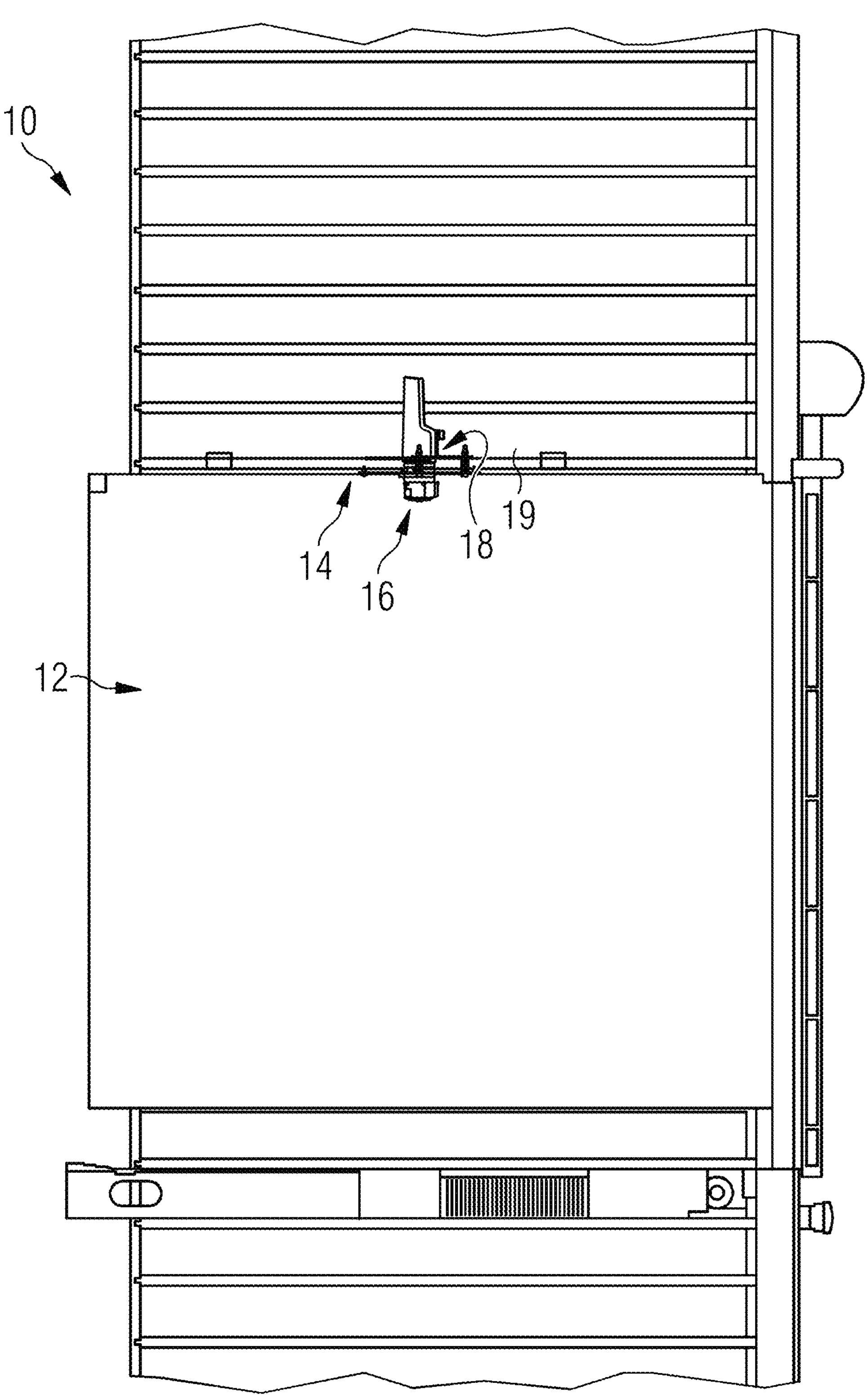
Figure 3:
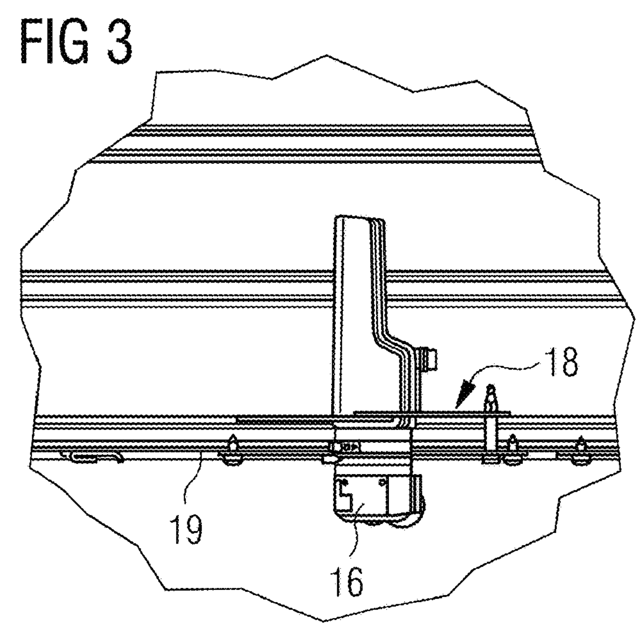
Figure 4:
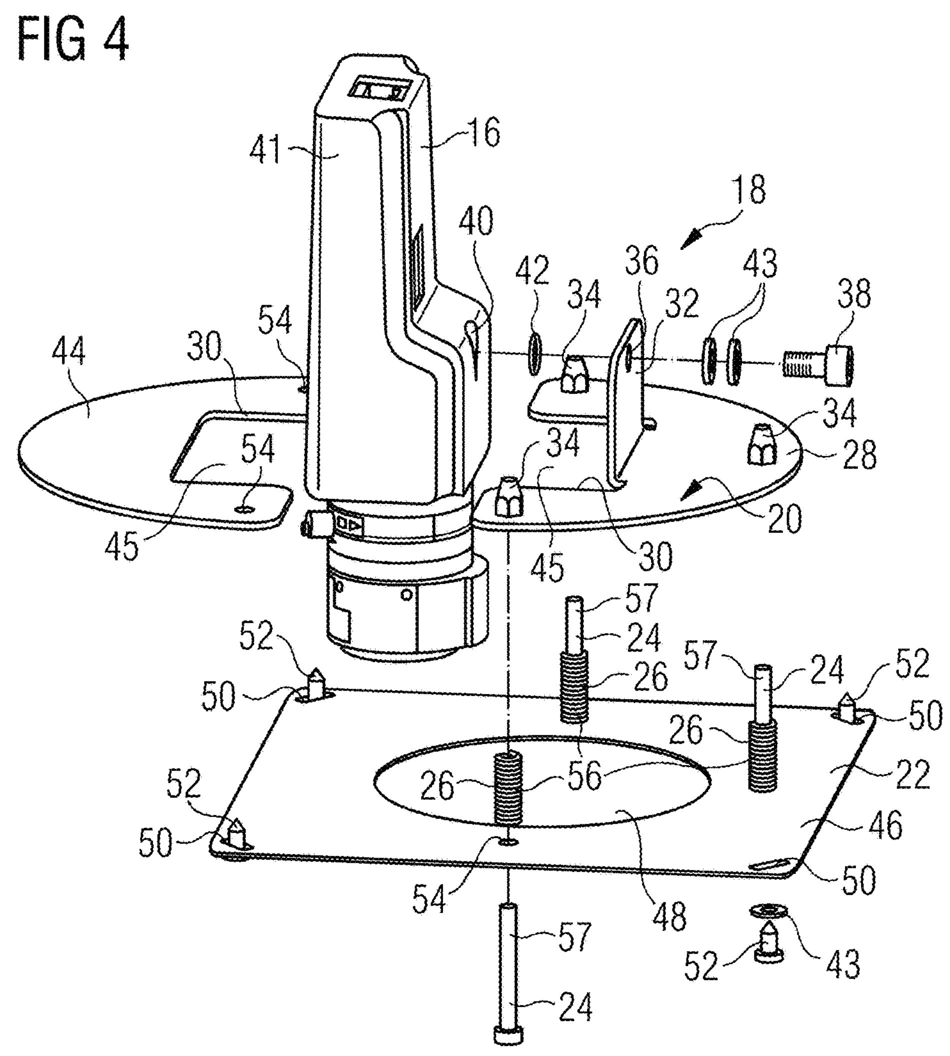
Figure 5:
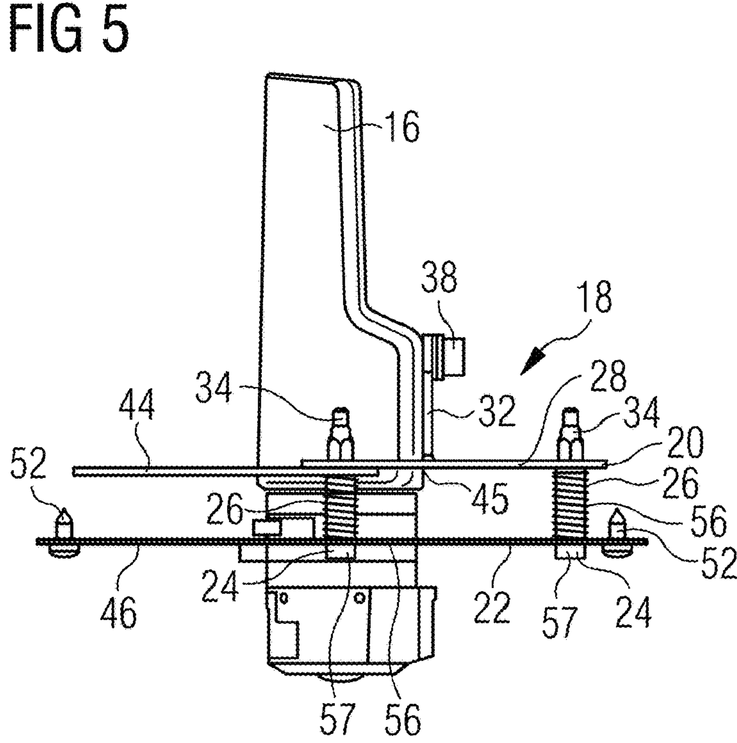

The invention is described in more detail below with reference to an embodiment example, which is shown schematically in the figures. The figures show:

FIG. 1 a perspective view of a retrieval location of a storage lift with a camera fixed to a camera holder;

FIG. 2 a vertical section through the retrieval location with the camera holder and the camera of FIG. 1;

FIG. 3 an enlarged section of the vertical section of FIG. 2;

FIG. 4 an exploded view of the camera holder with camera;

FIG. 5 a side view of the camera and the camera holder; and

Figure 6:
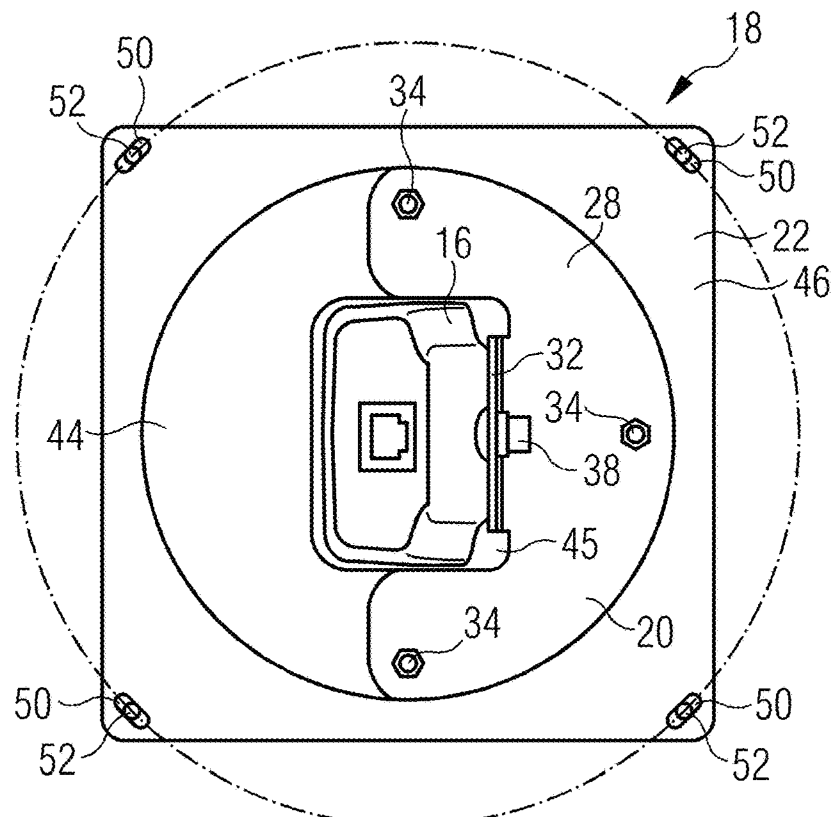

FIG. 6 an upper side view of the camera and the camera holder.

FIG. 1 shows a storage lift 10 with a retrieval location 12 for the storage and retrieval of not shown storage goods carriers on which stored goods are held.

A camera 16 is arranged on an upper side 14 of the retrieval location 12 to record the stored goods on a storage goods carrier. The images captured by the camera 16 are stored in a stored goods management system of the storage lift 10.

As can be seen in FIGS. 1 to 3, the camera 16 is fastened to the upper side 14 of the retrieval location 12 by means of a camera holder 18, the camera holder 18 being fastened to a cover 19 of the retrieval location 12.

According to FIGS. 3 to 6, the camera holder 18 has a holding device 20 for fastening the camera 16, a fastening device 22 for fastening the camera holder 18 to the upper side 14, three fastening elements 24 which connect the fastening device 22 to the holding device 20 and three spring elements 26 which are arranged between the holding device 20 and the fastening device 22 and which elastically couple the holding device 20 and the fastening device 22 to one another.

As can be seen in particular in FIG. 4, the holding device 20 has a base plate 28 on which a recess 30 for the camera 16 is provided. The base plate 28 is semi-circular and is made of metal. The base plate 28 has a vertically angled flange element 32 for fastening the camera 16 and three blind rivet nuts 34 for screwing in the fastening elements 24.

To fasten the camera 16 to the angled flange element 32, the latter has a hole 36 into which a cylinder screw 38 with a hexagon socket is inserted and screwed into an internal thread 40 of a housing 41 of the camera 16.

As can be seen in FIGS. 4 and 6, two washers 43 are provided between the flange element 32 and the cylinder screw 38. To increase friction, an O-ring 42 made of elastomeric material is arranged between the flange element 32 and the camera 16.

As can be seen in FIG. 3, a semi-circular metal cover plate 44 is also provided, which has a recess 30 for the camera 16. The cover plate 44 is connected to the base plate 28 via the fastening elements 24. In the connected state, the recesses 30 of the base plate 28 and the recess of the cover plate 44 form a through-opening 45 for the camera 16 to pass through. To connect the cover plate 44 to the base plate 28, the cover plate 44 has two through holes 54 through which two fastening elements 24 are passed.

The fastening device 22 is formed as a rectangular plate 46 made of metal, which has an opening 48 for the camera 16 to pass through.

The camera holder 18 is fastened to the cover 19 of the retrieval location via the plate 46. For this purpose, the plate 46 has four elongated holes 50 into which fastening screws 52 are inserted and which are screwed to the cover 19, as can be seen in particular in FIGS. 2 to 4. A washer 43 is arranged between each of the fastening screws 52 and the plate 46. The plate 46 together with the camera holder 18 and camera 16 can be rotated via the elongated holes 50 so that the camera holder 18 can be rotated in the lens axis.

To connect the plate 46 to the base plate 28, the plate 46 has three through-holes 54, through which the fastening elements 24 are passed and screwed into the blind rivet nuts 34.

The fastening elements 24 are formed as cylinder screws 57 with a hexagon socket. The plate 46 and the cover plate are connected to the base plate 28 via the cylinder screws 57 by passing the cylinder screws 57 through the through-holes 54 of the plate 56 and the through-holes 54 of the cover plate 44 and screwing them into the blind rivet nuts 34 of the base plate 28. The cylinder screws 57, in particular a portion of their thread, are provided with a microencapsulated adhesive. This enables vibration-proof mounting of the camera holder 18.

In the present case, the spring elements 26 are formed as compression springs 56, which are arranged between the cover plate 44, the base plate 28 and the plate 46 as shown in FIGS. 3 to 5 and are penetrated by the cylinder screws 57.

Thanks to the combination of cylinder screws 38 and compression springs 56, the camera holder 18 enables cost-effective and vibration-proof mounting of the camera 16. Furthermore, a simple adjustment of the camera 16 on the cover of the retrieval location 12 of the storage lift 10 is made possible with stepless tilting of the camera in several axes. The camera holder 18 according to the invention can be easily retrofitted into existing storage lifts.

LIST OF REFERENCE SYMBOLS

10 Storage lift
12 Retrieval location
14 Upper side
16 Camera
18 Camera holder
19 Cover
20 Holding device
22 Fastening device
24 Fastening element
26 Spring element
28 Base plate
30 Recess
32 Angled flange element
34 Blind rivet nut
36 Hole
38 Cylinder screw
40 Internal thread
41 Housing
42 O-Ring
43 Washer
44 Cover plate
45 Through-opening
46 Plate
48 Opening
50 Elongated hole
52 Fastening screw
54 Through-hole
56 Compression spring
57 Cylinder screw with microencapsulated adhesive

The invention claimed is:

1. A camera holder for fastening a camera to a storage lift, comprising a holding device for fastening the camera, a fastening device for fastening the camera holder to the storage lift, at least one fastening element which connects the fastening device to the holding device, and at least one spring element which is arranged between the holding device and the fastening device and which couples the holding device and the fastening device elastically to one another, wherein the fastening device is formed as a plate with an opening for the camera to pass through, and wherein the holding device is formed as a base plate which has a recess for the camera.

2. The camera holder according to claim 1, wherein three fastening elements and three spring elements are provided.

3. The camera holder according to claim 1, wherein the spring element is a compression spring, in particular a helical spring.

4. The camera holder according to claim 1, wherein the fastening element is a screw, wherein a portion of a thread of the screw is provided with a microencapsulated adhesive.

5. The camera holder according to claim 1, wherein the fastening device has elongated holes for receiving fastening screws which can be screwed to the storage lift.

6. The camera holder according to claim 1, wherein the holding device has at least one blind rivet nut with which the fastening element cooperates.

7. The camera holder according to claim 1, characterized in that a cover plate with a recess for the camera is provided, which is connected to the base plate via the fastening element, wherein the recesses form the opening for passing the camera through in the connected state.

8. The camera holder according to claim 1, wherein the holding device has an angled flange element for fastening the camera.

9. The camera holder according to claim 8, characterized in that at least one O-ring is arranged between the flange element and the camera.

10. The camera holder according to claim 1, wherein the spring element surrounds at least one section of the fastening element.

11. A storage lift for storing stored goods, comprising a camera holder, the camera holder comprising a holding device for fastening the camera, a fastening device for fastening the camera holder to the storage lift, at least one fastening element which connects the fastening device to the holding device, and at least one spring element which is arranged between the holding device and the fastening device and which couples the holding device and the fastening device elastically to one another, wherein the fastening device is formed as a plate with an opening for the camera to pass through, and wherein the holding device is formed as a base plate which has a recess for the camera.

12. The storage lift according to claim 11, characterized in that the camera holder is arranged on an upper side of a retrieval location of the storage lift.

13. The storage lift according to claim 11, wherein the fastening device of the camera holder is fastened to a cover of the retrieval location.

* * * * *